United States Patent [19]

Shuford

[11] Patent Number: 4,471,023

[45] Date of Patent: Sep. 11, 1984

[54] ENHANCEMENT COATING AND PROCESS FOR CARBONACEOUS SUBSTRATES

[75] Inventor: David M. Shuford, Grand Prairie, Tex.

[73] Assignee: LTV Aerospace and Defense Company, Dallas, Tex.

[21] Appl. No.: 480,028

[22] Filed: Mar. 29, 1983

[51] Int. Cl.³ .......................... B05D 3/02; B32B 9/00
[52] U.S. Cl. .................................. 428/408; 427/379; 427/397.8; 427/419.7; 428/446; 428/448; 428/698
[58] Field of Search .................. 427/379, 397.7, 397.8, 427/403, 419.7, 380, 113, 376.2, 419.2; 428/446, 448, 698, 408; 501/99, 100, 88

[56] References Cited

U.S. PATENT DOCUMENTS

| 3,275,471 | 9/1966 | Lowell et al. | 427/376.2 |
|---|---|---|---|
| 3,348,929 | 10/1967 | Valtschev et al. | 427/113 X |
| 3,396,054 | 8/1968 | Gremion | 427/113 X |
| 3,562,007 | 2/1971 | Bockstie | 427/387 X |
| 3,753,744 | 8/1973 | Komaru et al. | 501/100 X |

FOREIGN PATENT DOCUMENTS 1026055  4/1966  United Kingdom ................ 427/113

*Primary Examiner*—Michael R. Lusignan
*Attorney, Agent, or Firm*—James M. Cate; S. S. Sadacca

[57] ABSTRACT

A process for sealing silicon carbide primary coatings of carbonaceous substrates comprising impregnation and curing with tetraethyl orthosilicate, application of a sealant mixture followed by curing, application of a liquid sealant followed by curing, high temperature heat treatment, and repetitive of the application of the materials described above.

8 Claims, No Drawings

ENHANCEMENT COATING AND PROCESS FOR CARBONACEOUS SUBSTRATES

TECHNICAL FIELD

This invention relates to the protection of carbon and graphite materials from degradation at elevated temperatures. More particularly, the invention relates to the protection of reinforced carbon-carbon composite substrate materials having silicon carbide coatings. Specifically this invention relates to enhancement coatings used to seal the primary silicon carbide coatings so as to provide added protection against degradation, especially when cyclical temperatures will be encountered.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. Densification of the carbonaceous fibers can also be accomplished through use of chemical vapor deposition techniques to deposit carbon and form a matrix strengthens the material. However, the use of a specific substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a composition of matter and method for forming protective coatings on graphite and carbon materials, and especially for reinforced carbon-carbon composite materials. Copending application Ser. Nos. 251,798, now abandoned and 252,117, now abandoned, describe alumina and boron containing silicon carbide type primary coatings. These coatings are very effective to prevent degradation at temperatures of from about 2500 to about 3000° F. in oxygen containing atmospheres. However, where materials must withstand cycling temperatures which go above and drop below about 2500° F. additional protection against degradation is desirable.

Previously, enhancement coatings, applied to the surface of the primary silicon carbide coatings have been known and described as useful in providing added protection. Enhancement coatings are desirable even where cyclical temperatures will not be a problem. However, it is theorized that under cycling temperature conditions the primary coatings can develop microcracks of fissures which then expose uncoated portions of the carbonaceous substrate to oxidation. Impregnation with tetraethyl orthosilicate (TEOS) which penetrates the microcracks in the primary coating and then, upon curing, converts to silicon dioxide, is known to provide protection to otherwise exposed carbonaceous surfaces. It has also been known to use a silicon carbide paste and liquid alkali silicate materials in combination with TEOS impregnation to provide fairly effective enhancement coatings. However, further improved enhancement coatings are measured, for example, by their ability to reduce material loss under oxidation testing, are highly desirable.

DISCLOSURE OF THE INVENTION

In accordance with the present invention a method is provided for forming an enhancement coating which acts to seal a primary silicon carbide coating of a carbonaceous substrate in an especially effective manner. Carbonaceous substrates which comprise both a silicon carbide coating and the improved enhancement coating of the subject invention have excellent resistance to degradation due to oxidation in environments with cycling temperatures as high as about 3,000° F. and as low as −300° F.

Broadly, the process for sealing a primary silicon carbide coating of a carbonaceous substrate (resulting in formation of the improved enhancement coating of the subject invention) comprises the steps of impregnating the primary coating with tetraethyl orthosilicate (TEOS), heat curing the TEOS, evenly applying a sealant mixture of a liquid alkali silicate and particulate silicon carbide, heat curing the sealant mixture, evenly applying a liquid alkali silicate sealant, heat curing the liquid sealant, heat treating the resultant sealed primary coating either at approximately 1800° F. in an inert atmosphere or at about 1000 to 1200° F. in air, and subsequently repeating the TEOS impregnation, the application of the sealant mixture and the application of the liquid sealant. The resulting enhancement coating provides reduced weight loss of materials under oxidation test conditions as compared to similar silicon carbide coated carbonaceous substrates which have been subjected only to TEOS impregnation, or a combination of TEOS impregnation with applications of sealant mixture and liquid sealant.

In its preferred embodiment the process of the subject invention includes a TEOS impregnation step wherein five separate impregnation/cure applications of TEOS are performed with a high temperature cure period following the last of the five applications. The preferred embodiment also includes two applications of the sealant mixture (each application being subjected to a heat cure) followed by a single application of the liquid sealant which is also heat cured prior to the high temperature treatment which precedes a second application of TEOS, sealant mixture, and liquid sealant, respectively.

DETAILED DESCRIPTION

The process and resulting enhancement coating of the subject invention basically includes application of three separate materials to the silicon carbide coating of the carbonaceous substrate. As noted above, application of those materials, followed by appropriate heat curing, forms a first part of the process followed by an elevated temperature heat treatment, after which application of those three materials is again repeated. For convenience of description, the method of application of each of these three types of materials, along with a more detailed description of the preferred materials will be set forth separately with respect to each material.

TEOS Impregnation

Technical grade tetraethyl orthosilicate can be activated for use in the process by addition of an appropriate amount of acid such as, for example, 22 parts by volume of 0.05 normal hydrochloric acid per 100 parts by volume TEOS. Any TEOS materials which gels due to aging should be discarded and not utilized in the process. Depending upon the configuration of the part to be treated, TEOS may be applied either by hand or through filling of a vacuum bag encasing the part to be treated. After application of the TEOS a first heat treatment to cure the TEOS is effected by heating to temperatures between about 225 and 275° F. for between about 45 and 60 minutes after the TEOS solidifies, forming crystals. Preferably, second, third and fourth applications of TEOS, each followed by its own heat cure cycle are repeated in the same manner as disclosed above with respect to the first application of TEOS. Preferably then a fifth application of TEOS is effected, followed by heat cure at the same temperatures (225 to about 275° F.) but for approximately 2 to 2½ hours rather than 45 to 60 minutes.

Once five applications and five cure cycles of TEOS have been effected, the TEOS impregnated part is then subjected to an additional heat treatment of approximately 400° F. for about 2 hours continuing with a rise in temperature between about 565 and 625 for between about 4 and 7 hours.

Sealant Mixture

After the primary coating of the carbonaceous substrate has been impregnated with TEOS and heat cured in the manner described above, the next step in the process is to apply a layer of sealant mixture of an alkali silicate and particulate silicon carbide to the TEOS impregnated silicon carbide coating. Preferably, the sealant mixture comprises a weight ratio of liquid alkali silicate to particulate silicon carbide powder of about 1:1. Alternatively, a mixture of water, sodium borate and sodium silicate can be substituted for the liquid alkali silicate.

The preferred type of liquid alkali silicate material utilized in preparation of the sealant mixture is sold under the trade name "Sermabond 487" by the Sermetel Company of Limerick, Pennsylvania. In the alternative, the water mixture of sodium borate and sodium silicate which can be substituted therefor can be produced by admixing approximately 10 grams of sodium borate per 100 ml of water and 100 ml. of sodium silicate solution containing 38% solids (sold by Ridlen's Manufacturing Company of Dallas, Texas).

Either of the above, liquids is admixed with silicon carbide powder material to form the sealant mixture. The preferred type of silicon carbide is sold under the trade designation of "RA 1200-Black Grit" by the Carborundum Company. Another source for silicon carbide to be used in the sealant mixture is silicon carbide powder prepared from graphite felt. Preferably, graphite felt utilized is "Grade WDF" from the Union Carbide Company, Carbide Products Division of New York, New York. The graphite felt can be converted to silicon felt by packing the felt in a mixture containing between about 30 and 60% by weight silicon carbide, between about 30 and 50% by weight silicon and between about 10 and 20% by weight alumina. The packed graphite felt is heated to between about 2950° F. and 3050° F. for about 5 to 6 hours. After the graphite felt has been converted to silicon carbide felt, the felt is powdered by any suitable method, such as a ball mill. The powdered silicon carbide converted felt should have a small random fiber size. Preferably, the fibers will have a diameter of about 8 microns and will be of varied length, ranging between about several microns and .01 inches. It is especially preferred to use a 50—50 mixture of silicon carbide prepared from such graphite felt with the silicon carbide powder disclosed above.

The sealant mixture is prepared by simply thoroughly admixing the liquid alkali silicate and silicon carbide powder together to form a paste-like material. The sealant mixture can then be applied to the part to be treated by using a brush, spatula or by other hand application techniques, care being used to maintain a wet surface on the area of the part which is being coated as the sealant mixture is being applied.

The sealant mixture is then air dried (requiring approximately 16 hours under ambient conditions) and then subjected to a heat cure treatment which includes approximately 2 hours at temperatures in the range of from about 185 to 225 and preferably at 200° F., 2 hours at temperatures between about 375 and 425 and preferably 400° F., and finally 4 to 7 hours at temperatures between 575 and 625° F. and preferably at 600° F.

In the preferred embodiment of the method of the present invention a second application of the sealant mixture, followed by the curing cycle set forth above, is applied.

Liquid Sealant

After the preferred double application of the sealant mixture a final application of liquid alkali silicate sealant material is employed. The sealant material is the same liquid alkali silicate material described above which is used in the sealant mixture. Thus, it can either be the commerically available "Sermabond 487" described above or a mixture of water, sodium borate, and sodium silicate solution, also discussed above.

The liquid sealant material can be brushed onto the part to be treated, care being taken to completely cover the part so as to fill any holes, voids, cracks, etc. which may not have been completely filled through application of the sealant mixture described above.

The liquid sealant material is then dried and cured in accordance with the curing cycle set forth above with respect to the sealant mixture, i.e., preferably air drying followed by stepped heat curing at approximately 200° for 2 hours, 400° for 2 hours and 600° for 4 hours.

High Temperature Heat Treatment

After the silicon carbide coated carbonaceous part has been impregnated with TEOS and the sealant mixture and liquid sealant materials have been applied and heat cured in the manner described above, the entire part is subjected to a high temperature heat treatment. If the treatment is to be effected in air, temperatures of from about 1000 to 1200° F. can be employed for periods of approximately 0.5 hours. A preferred method, however, is to heat treat at approximately 1800° F. for 1 hour in an inert atmosphere. Preferably, argon is employed as the inert atmosphere by evacuating the furnace and flooding same with argon to a pressure of approximately 3 psi. After the above-described high temperature heat treatment, the part is again subjected to TEOS impregnation in the manner described above followed by application of a sealant mixture in the manner described above and finally application of the liquid alkali silicate sealant in the manner described above. In each case, the materials, number of applications and heat curing cycles are exactly repetitive of those set forth hereinabove.

It has been surprisingly discovered that carbonaceous substrates protected by silicon carbide coatings which are provided with an enhancement coating through the method described above have greatly reduced material loss when subjected to oxidation testing. The reduction in loss of material through oxidation is much reduced when compared to silicon carbide coatings which have been post-coated using only a single TEOS impregnation cycle followed by sealant mixture and liquid sealant applications (i.e., those not subjected to the heat treatment and the second set of applications).

The following example is set forth solely for the purpose of further demonstrating the process and enhancement coatings of the subject invention and not for the purpose of limiting same.

Table 1, set forth below, indicates the original weight of each sample, its coated weight (i.e., the weight of the sample and its primary silicon carbide coating) and the percent change in weight effected through each application of TEOS, sealant mixture, and liquid sealant.

EXAMPLE 2

The samples prepared in accordance with the process of the subject invention in Example 1 were subjected to an oxidation test wherein they were exposed in air at a temperature of 1000° F. Table 2, set forth below, indicates the relative weight loss in grams per square centimeter for each such sample at selected intervals throughout the 30 hour test.

While the invention has been described with respect to its preferred embodiments, it will be understood that various modifications and alterations might be made without departing from the intended scope of the appended claims. Various modifications of the preferred embodiments described above will now be apparent to those skilled in the art and only such limitations as are expressed in the appended claims are intended to measure the scope of the subject invention.

TABLE 1

| Sample | Orig. Wt. | Coated Wt. | TEOS* Δ Wt. % | Cumulative Δ Wt. Sealant Mix Wt. % | Sealant Mix Δ Wt. % | Liquid Sealant Mix Δ Wt. % | Δ Wt. in 1800° F. H.T.** |
|---|---|---|---|---|---|---|---|
| A | 66.2777 | 71.6614 | 1.41 | 1.77 | 2.21 | 2.35 | −0.07 |
| B | 66.3790 | 72.3789 | 1.34 | 1.67 | 2.07 | 2.23 | −0.072 |
| A (cont) | — | — | 0.18 | 0.37 | 0.54 | 0.61 | |
| B (cont) | — | — | 0.22 | 0.43 | 0.59 | 0.66 | |

*Each TEOS application comprised five separate applications and heat cures.
**Difference in weight of each sample due to heat treatment.

TABLE 2

| | 1000° F. Oxidation Test Weight Change in gms/cm$^2$ (surface area) | | | | | | | | |
|---|---|---|---|---|---|---|---|---|---|
| Sample | 3 hrs. | 6 hrs. | 9 hrs. | 12 hrs. | 15 hrs. | 18 hrs. | 21 hrs. | 24 hrs. | 27 hrs. | 30 hrs. |
| A | −0.0001 | −0.0001 | −0.0001 | −0.0003 | −0.0004 | −0.0001 | −0.0005 | −0.0008 | −0.000 | −.0009 |
| B | −0.0001 | −0.0002 | −0.0003 | −0.0003 | −0.0005 | −0.0002 | −0.0007 | −0.0010 | −0.000 | −0.0011 |

EXAMPLE

Two samples of reinforced carbon-carbon substrate coated with a silicon carbide coating formulated from a mixture of 30% silicon carbide, 50% silicon and 20% alumina (by weight) were subjected to the enhancement coating process of the subject invention. The process included five applications (each followed by a one hour cure at 250° F.) of TEOS with a final heat treatment of 2 hours at approximately 400° and 4 hours at approximately 600° F. Next, two applications of sealant mixture were applied using curing cycles of 2 hours at 200°, 2 hours at 400° and 4 hours at 600° F. after each application. The sealant mixture used was a 50/50 mixture by weight of "Sermabond 487" with silicon carbide powder one half of which by weight was silicon carbide sold under the trade designation "RA1200-Black Grit," the other half being produced from grade "WDF" graphite felt. Finally, each of the samples received a liquid sealant application of "Sermabond 487" cured at 2 hours at 200°, 2 hours at 400° and 4 hours at 600° F.

Each of the samples was then subjected to 1800° F. in an argon atmosphere for approximately 1 hour.

Each sample was then retreated with five separate TEOS impregnation/cure cycles, two applications of the sealant mixture and one application of the liquid sealant material.

I claim:

1. A process for sealing a primary silicon carbide coating of a carbonaceous substrate comprising the steps of:
   (a) impregnating the primary coating with tetraethyl orthosilicate;
   (b) heat curing the tetraethyl orthosilicate applied to the primary coating;
   (c) evenly applying a sealant mixture of a liquid alkali silicate and particulate silicon carbide to the primary coating;
   (d) heat curing the sealant mixture;
   (e) evenly applying a liquid alkali silicate sealant;
   (f) heat curing said liquid sealant;
   (g) heat treating the resultant sealed primary coating at approximately 1800° F. in an inert atmosphere; and
   (h) repeating steps (a)–(f) above.

2. The process of Claim 1 wherein in step (a) five separate applications of tetraethyl orthosilicate are performed each application being followed by a heat cure comprising the application of temperatures in the range of from about 225° to about 275° F. for a period of between 45 and 60 minutes with a further heat treatment following the last of the five applications comprising exposure to temperatures in the range of from about 375° F. to about 425° F. for a period of about 2 hours and exposure to a temperature in the range of about 565° to about 625° F. for a time period of between about 6 and 7 hours.

3. The process of claim 1 wherein two applications of sealant mixture are applied, each followed by heat curing.

4. The method of claim 3 wherein heat curing of said sealant mixture includes two hours at temperatures in the range of from about 185° to 225° F., two hours at temperatures in the range of between about 375° to 425° F. and four to seven hours at temperatures in the range of between about 575° and 625° F.

5. The process of claim 1 wherein the process of curing said liquid sealant includes application of temperatures in the range of 185° to 225° F. for approximately two hours, temperatures in the range of 375° to 425° F. for approximately two hours and finally the application of temperatures in the range of 575° to 625° F. for a period of about 4 to about 7 hours.

6. The process of claim 1 wherein said particulate silicon carbide comprises a 50/50 mixture by weight of powdered silicon carbide and silicon carbide produced from graphite felt.

7. A carbonaceous substrate coated with a primary silicon carbide coating sealed using the process of claim 1.

8. A process for sealing a primary silicon carbide coating of a carbonaceous substrate comprising the steps of:
   (a) impregnating the primary coating with tetraethyl orthosilicate;
   (b) heat curing the tetraethyl orthosilicate applied to the primary coating;
   (c) evenly applying a sealant mixture of a liquid alkali silicate and particulate silicon carbide to the primary coating;
   (d) heat curing the sealant mixture;
   (e) evenly applying a liquid alkali silicate sealant;
   (f) heat curing said liquid sealant;
   (g) heat treating the resultant sealed primary coating at temperatures of from about 1000° F. to about 1200° F. in air for approximately 0.5 hours; and
   (h) repeating steps (a)–(f) above.

* * * * *